United States Patent [19]

Schneider et al.

[11] Patent Number: 5,126,053
[45] Date of Patent: Jun. 30, 1992

[54] METHOD FOR MANUFACTURING HOLLOW FIBER PILES

[75] Inventors: Klaus Schneider; Rudi Wollbeck, both of Erlenbach; Thomas Zang, Goldbach, all of Fed. Rep. of Germany

[73] Assignee: Akzo N.V., Netherlands

[21] Appl. No.: 656,818

[22] Filed: Feb. 15, 1991

[30] Foreign Application Priority Data

Feb. 17, 1990 [DE] Fed. Rep. of Germany ....... 4005132

[51] Int. Cl.$^5$ .............................................. B01D 69/08
[52] U.S. Cl. ....................................... 210/640; 55/16; 264/45.1
[58] Field of Search ................ 156/169; 210/634, 640, 210/644, 649, 650–654, 500.23; 264/41, 45.1; 55/16, 158

[56] References Cited

U.S. PATENT DOCUMENTS 4,224,094  9/1980  Amicel et al. .
4,267,630  5/1981  Sebring .
4,940,617  7/1990  Baurmeister .

FOREIGN PATENT DOCUMENTS 0021582   1/1981   European Pat. Off. .
0093677  11/1983   European Pat. Off. .
0269213   6/1988   European Pat. Off. .
0285812  10/1988   European Pat. Off. .
0177510  10/1989   European Pat. Off. .
0350853   1/1990   European Pat. Off. .
3803693   9/1988   Fed. Rep. of Germany .
3823858   2/1990   Fed. Rep. of Germany .
2222134  10/1974   France .
2012237A  7/1979   United Kingdom .

Primary Examiner—Frank Sever
Attorney, Agent, or Firm—Oliff & Berridge

[57] ABSTRACT

In a method for manufacturing hollow fiber piles, at least one hollow fiber strand is wound spirally onto a rotating drum having a polygonal cross section to form superimposed hollow fiber layers thereon, forming a hollow fiber roll on the drum. Once the desired number of hollow fiber layers has been formed on the rotating drum, segments of a desired shape are separated from substantially planar regions of the hollow fiber roll. Simultaneously, or immediately following this separation, adjacent end regions of the hollow fibers are connected with one another at least spotwise.

18 Claims, 3 Drawing Sheets

METHOD FOR MANUFACTURING HOLLOW FIBER PILES

BACKGROUND OF THE INVENTION

1. Field of the Invention

The present invention relates to a method for manufacturing hollow fiber piles, in which the hollow fibers are arranged in planes lying parallel to one another, the hollow fibers of each plane being arranged substantially parallel and at least partially spaced apart from one another, the hollow fibers of adjacent planes crossing one another and adjacent end regions of the hollow fibers being connected with one another at least spotwise.

2. Description of the Related Art

A device for filtering gaseous or fluid dispersions through the porous walls of hollow fibers is known from DE-OS 38 23 858, in which the porous hollow fibers are arranged in a plurality of superimposed hollow fiber layers with the open ends of the hollow fibers being embedded in a tubular embedding material. The latter encloses a flow duct for containing the dispersion to be filtered and which is non-permeable to the dispersion. The hollow fiber arrangement of this known device can be obtained by stacking a number of individual filter elements on top of one another. Each individual filter element is formed by being punched out of a conventional flat hollow fiber article, such as, for example, a hollow fiber mat, hollow fiber cloth or the like. After a number of individual filter elements are stacked one on top of the other, the hollow fiber stack obtained in this manner is subjected to an embedding procedure, in which the hollow fiber ends are embedded in the tubular embedding material. In the resulting structure, the porous hollow fibers within one layer of the hollow fiber stack can be advantageously arranged parallel to one another. Additionally, the hollow fibers of adjacent layers can preferably cross one another. The punching out of the filter elements can also be effected along with a simultaneous welding of the cutting sites.

In this known method, it is first necessary to manufacture a flat hollow fiber article, wherein the hollow fibers are arranged in a substantially solid formation, so that the flat article can be safely handled, i.e., for example, rolled together, transported, rolled up, spread out, stacked, etc., without the arrangement of hollow fibers, i.e. the parallel position for example, being lost in the flat article. The resulting manufacturing process for the filter elements is therefore complicated and also entails the danger of the hollow fibers already being damaged during the manufacture of the flat hollow fiber article and/or during the subsequent handling thereof. Flat hollow fiber articles of this type often also comprise means for securing the hollow fibers, such as warp threads, which necessarily remain in the hollow fiber stacks and therefore also in the filter device, which is not always desirable or advantageous.

A method for manufacturing a hollow fiber bundle is known from EP-B1-0 093 677, in which at least one hollow fiber from at least one bobbin is wound by means of a thread guide device onto alternate outer ends of a drum, the hollow fibers forming successive layers and overlapping one another from one layer to the next. The hollow fibers are cut along longitudinal planes, which are parallel to the axis of the drum, at regular intervals essentially corresponding to the length of the desired bundles, so that a plurality of hollow fiber mats of overlapping fibers are formed, which are substantially flat and are open at both outer ends. Each of the hollow fiber mats formed in this manner is rolled up spirally in the longitudinal direction in order to form a corresponding number of hollow fiber bundles.

The manufacture of hollow fiber piles is not taught or suggested by EP-B1-0 093 677. Additionally, as a result of the rolling up of the hollow fiber mats, the initially formed uniform arrangement of the hollow fibers is partially destroyed because the means provided for at least temporarily securing the cut ends of the hollow fibers to the substrates, cannot prevent a displacement and shifting of the hollow fibers.

OBJECTS AND SUMMARY OF THE INVENTION

It is an object of the present n to provide a method by which hollow fiber piles can be easily and, therefore, extremely economically manufactured without the need for providing any structure for securing the hollow fibers in position which may interfere with flow of liquids or gases through the fiber pile.

The above and other objects are attained and the shortcomings discussed above are overcome according to the present invention which provides a method of manufacturing hollow fiber piles. According to the present invention, at least one hollow fiber is wound spirally, using a reciprocating thread guide device, onto a drum rotating about its longitudinal axis and having a polygonal cross section. Superimposed substantially planar hollow fiber layers are formed by this winding on the rotating drum. These hollow fiber layers are formed in such a manner that the hollow fiber sections (windings) of one layer (plane) cross the hollow fiber sections (windings) of the directly overlying and underlying layers (planes), but within each respective layer (plane), the hollow fiber sections (windings) extend substantially parallel to one another and are at least partially spaced apart from one another. The winding process is ended once the desired number of hollow fiber layers has been obtained. Segments (hollow fiber piles) of a desired shape are separated from substantially flat regions of the hollow fiber roll formed in this manner. Simultaneously, or immediately following this separation, adjacent end regions of the hollow fibers of a pile are connected with one another in an at least spotwise manner.

BRIEF DESCRIPTION OF THE DRAWINGS

The invention is explained in further detail with reference to the following simplified schematic drawings, in which.

DETAILED DESCRIPTION OF THE PREFERRED EMBODIMENTS

Figure 1:
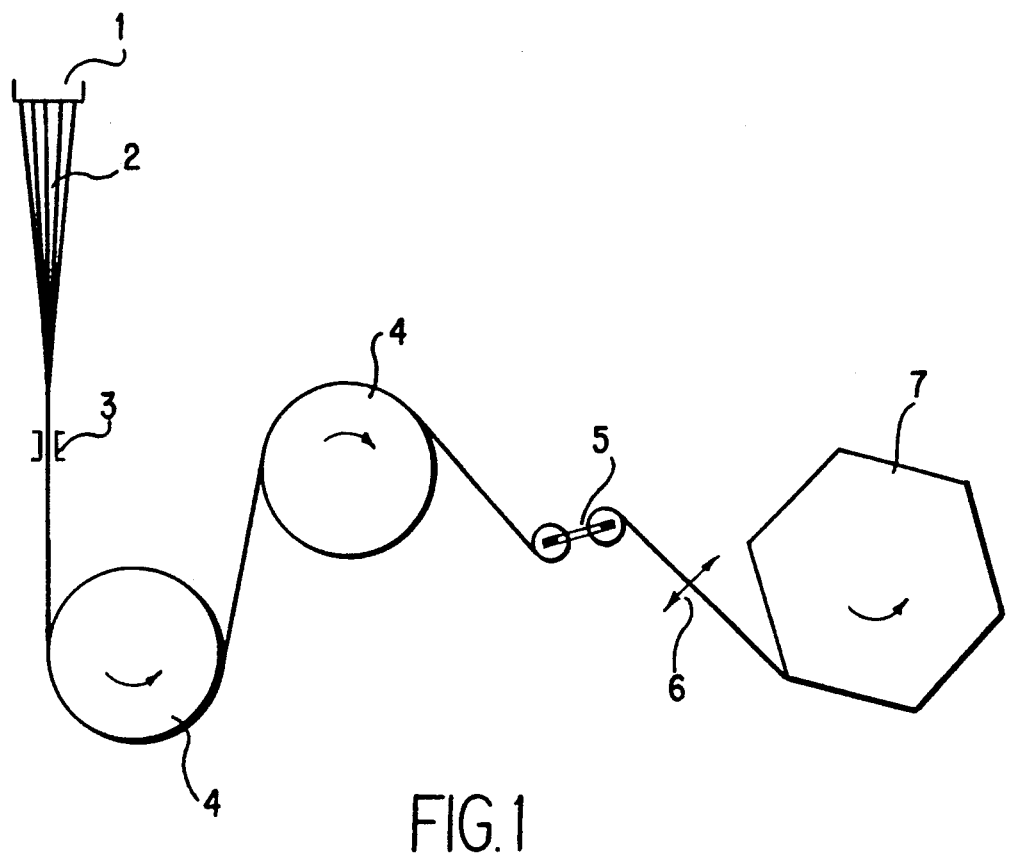
FIG. 1 diagrammatically illustrates one embodiment of the present inventive method, wherein a plurality of hollow fibers are wound around a polygonal drum.

The method according to the present invention has proved particularly expedient for the manufacture of hollow fiber piles from hollow fibers which are suitable for separating gas from a fluid.

Within the framework of the description provided herein, the term "fluid" is understood to mean a natural or synthetically produced gas mixture, for example air or natural gas; or a liquid-gas mixture in which gas (or a gas mixture) is present in the form of gas bubbles, in dissolved form, or chemically bonded. It is also possible for the fluid to contain a vaporous component.

The aim of gas separation is, for example, the most extensive, most complete separation possible of naturally occurring gas mixtures such as natural gas, air, or other gas mixtures, which are produced as a product or as a waste product (waste gas) into their individual components, and the recovery of these individual components. In this respect, it is also possible to separate and use only individual components (i.e., less than all of the components) of a gas mixture.

The aim of the degasification of liquids is, for example, the most complete separation possible of a gas (or a gas mixture) which is present in the liquid in dissolved form, in chemically bonded form, or in the form of gas bubbles. The separation of gas (or a gas mixture) dissolved in a fluid can be effected by maintaining a transmembrane concentration or a partial) pressure drop.

The hollow fibers suitable for the separation of gas from a fluid comprise a wall acting as a (semi-permeable) membrane. The type of membrane used is therefore a membrane in hollow fiber form, also known as a hollow thread membrane, a hollow fiber membrane, or a capillary membrane. The separation of gas from a fluid using membranes in hollow fiber form, and the membrane materials suited to this end are known per se.

So-called non-porous membranes are used for the separation of gas components from a gas mixture, whereas porous to microporous non-wettable membranes are usually used for the separation of gas bubbles from a liquid. For the removal of dissolved or chemically bonded gases from liquids, both porous and non-porous membranes can be used and the membranes can be wettable or non-wettable.

The separation of gas from a fluid is effected, for example, in such a manner that the hollow fibers are acted upon externally by the fluid which is to be treated and the separated gas component(s) or separated gas (or gas mixture) is/are drawn off from the inside (lumen) of the hollow fibers.

In order to carry out the method, briefly described above by way of example, as economically as possible, it is necessary to provide as large a membrane surface as possible for effecting the gas separation on as small a space as possible. In order to achieve this, the hollow fiber diameter and sparing between the hollow fibers needs to be as small as possible. This is obtained by an arrangement of the hollow fibers which is as dense as possible but nevertheless orderly in the flow duct for the fluid to be treated. With the method according to the present invention, it is now possible to manufacture in a simple manner hollow fiber piles for hollow fiber modules or separating devices which fulfil these requirements.

From the hollow fiber piles manufactured according to the present invention, it is possible to produce hollow fiber modules, in which the hollow fibers are arranged in planes which lie substantially perpendicular to the direction of flow, i.e. perpendicular to the axial direction of the module. The end regions of the hollow fibers are embedded in a sealing compound which is designed as an annular or tubular element and forms a flow duct. The hollow fibers, which are open at both ends, are guided through the tubular element and open onto the external cylindrical surface (circumferential surface) of the sealing compound (or tubular) element. Hollow fiber modules of this general construction are known per se.

Additionally, depending on the type of hollow fibers used or the selected method of conduction or parameters used, the hollow fiber modules or devices formed from hollow fiber piles manufactured according to the present invention are also suitable for the gasification of fluids, for filtration (including ultra- and microfiltration), or as heat exchangers.

For the manufacture of a hollow fiber pile, an individual hollow fiber can be wound about a drum according to the present invention. It is also possible, however, to simultaneously wind a plurality of hollow fibers about a drum, and it is possible in this case to wind the hollow fibers in bundled form or as a group of threads. When winding a hollow fiber bundle, the depositing of the bundle onto the drum must be effected in such a manner that a distance is maintained between adjacent hollow fiber bundle sections (windings) of one layer. The winding of a hollow thread group can be effected using a comb-shaped reciprocating thread guide device, it being possible for the hollow thread group to comprise a plurality of individual hollow fibers or a plurality of hollow fiber bundles, which are wound spaced apart in each case onto the winding drum.

The method according to the present invention is particularly advantageously used for processing newly-spun hollow fibers to form hollow fiber piles, i.e. directly at hollow fiber spinning machines which form the hollow fibers. In this case, it is then also possible to wind onto the drum not only a single hollow fiber, but a plurality of hollow fibers, which are spun from a multi-aperture nozzle, for example, and wound onto the drum as a bundle or group of threads.

The processing of newly-spun hollow fibers directly at the hollow fiber spinning machine offers the great advantage of dispensing with the otherwise necessary possibly multiple rewinding of the hollow fibers, during which the hollow fibers are subjected to varying tensile stresses, as well as multiple reversing and sliding over thread guide elements. In addition to the considerable reduction in manufacturing costs for the hollow fiber piles, an extremely careful processing of the hollow fibers is also obtained in this manner. Additionally, with the processing of newly spun hollow fibers, no or only an extremely small quantity of coating is necessary to protect the hollow fibers as they are guided over thread guide elements, which is a great advantage since the coating impairs the adhesion between hollow fiber and embedding material during the subsequent embedding of the hollow fiber ends.

This particularly preferred embodiment of the method is possible because the winding speed onto the winding drum can be easily adapted to the sometimes high spinning velocities, for example, merely by changing the rotational speed of the drum.

However, other embodiments are also possible. For example, a plurality of hollow fibers can be firstly wound onto bobbins in bundled form and subsequently wound onto the winding drum as single or multiple bundles or as a group of threads, as already described above.

Furthermore, it is possible using the method according to the present invention to adjust the packing density within a wide range and thereby to obtain a very homogenous geometrically correct formation of the hollow fiber pile, which ensures a good and uniform through-flow of material through the entire hollow fiber stack of a hollow fiber module. A change in the packing density can be effected simply, for example, by altering the reciprocating speed of the thread guide device whilst maintaining the rotational speed of the drum substantially constant. An increase in the former speed, i.e. an increased (double) number of strokes of the reciprocating device per unit of time, leads to greater winding distances on the drum and therefore to a reduced packing density. The packing density is understood to mean the ratio of the volume filled by hollow fibers to the overall volume of the module, expressed as a percentage.

In order to obtain a uniform distribution of the hollow fibers on the polygonal winding drum, the rotational speed of the drum, and the reciprocating velocity and width of the reciprocating thread guide need to be coordinated or constantly varied in such a manner that the position of the reversing point (the point where the hollow fiber reaches an extreme longitudinal location on the drum and where the direction of the reciprocating thread guide is reversed) lies at a different point on the surface of the winding drum each time the direction of the reciprocating thread guide is reversed. That is, the position of the reversing point on the surface of the drum travels along the drum surface as the hollow fiber is wound on the drum not only in the circumferential direction of the drum, but also in the longitudinal direction of the winding drum. This is necessary because the hollow fibers are always firstly brought to rest only upon the edges of the winding drum and in the interim the as yet undeposited hollow fiber sections have no contact with the winding drum.

The manufacture of a hollow fiber pile is effected in such a manner that, once a given winding thickness on the winding drum is obtained, one or more segments (or hollow fiber piles) having a shape of, for example, round or polygonal (e.g. rectangular or hexagonal), are automatically or manually cut out of or punched out of each planar surface of the polygonal drum. This cutting can be effected mechanically, thermally or using ultrasound, for example.

The separation of the hollow fiber piles from the wound drum can be effected in such a manner that, at the same time as the hollow fibers are cut, the hollow fiber ends (formed by the cutting procedure) are extensively or completely sealed (e.g., welded), which has the advantage that during the subsequent embedding of the end regions of the hollow fibers, embedding material (sealing compound) is prevented from penetrating the hollow fiber interior (lumen). At the same time that the separation takes place, adjacent ends of the hollow fibers can be connected with one another at least spotwise. In this manner, a hollow fiber pile is produced in one working step, in which pile the hollow fibers already form a sufficiently solid unit to allow the hollow fiber pile to be handled safely and to be transported and further processed to form hollow fiber modules without destroying the previously produced extremely uniform and correct arrangement of the hollow fibers. For example, when the cutting is performed thermally, the piles are separated from the winding drum, the hollow fiber ends are sealed, and the adjacent ends of hollow fibers are connected with one another in one working step.

It is, however, also possible to connect adjacent end regions of the hollow fibers, at least spotwise, only directly after the cutting of the hollow fibers and, where possible, before the removal of the hollow fiber pile from the winding drum. The connection of adjacent end regions of hollow fibers is effected, for example, by the application (e.g., by spraying) of an adhesive or the like.

All of the described method steps can be carried out fully automatically, i.e. in an on-line process.

A hollow fiber module car be produced from one or more hollow fiber piles manufactured according to the present invention. In this respect, for example, a plurality of these hollow fiber piles can be placed one on top of the other, it being possible to arrange adjacent hollow fiber piles so that they are rotated relative to one another through a specific angle about the longitudinal axis of the hollow fiber stack which is to be formed. In this manner, a hollow fiber stack is obtained, in which the hollow fibers are distributed homogeneously and uniformly.

The manufacture of a hollow fiber module from a single hollow fiber pile or a hollow fiber stack formed in the above-described manner is effected in such a manner that the end regions of the hollow fibers are embedded in a hardening embedding material (sealing compound), which embedding is effected, for example, by centrifuging. With the removal of part of the hardened embedding material (sealing compound) from the outer circumference of the module, the lumen of the hollow fibers are then opened and exposed. The module can then be fitted into a housing corresponding to its dimensions and having the necessary seals and connections for the supply of the fluid to be treated and for drawing off the treated fluid and the separated permeate, e.g. the gas component, gas mixture, etc. It is, however, also possible to arrange a plurality of modules connected in parallel and/or in series in a common housing.

Disc-shaped modules (so-called disc modules) have proved particularly expedient, particularly in situations where the separation step is effected from the outside inwards through the hollow fibers, since in this case an intensive mixing and therefore an intensive substance exchange is obtained on the outside of the hollow fibers and the path which the permeate needs to cover inside the hollow fibers is half the hollow fiber length at the most. This advantage is also maintained in the case of separating devices constructed from a plurality of stacked disc modules, since the short length of the permeate path favoring the separation is maintained in this case.

FIG. 1 shows a particularly preferred embodiment of the method using newly-spun hollow fibers. In this preferred embodiment, the path of the hollow fibers 2 extends from the spinning nozzle 1 to the winding drum 7. The hollow fibers 2 are spun as a group of threads from a multi-aperture nozzle 1 and are combined to form a cable strand having substantially parallel hollow fibers 2. It is also possible to supply a protective coating (or the like) at the joining site 3, which coating surrounds each individual hollow fiber 2 with a thin lubricant layer. The dimensions of the spun hollow fibers 2 are determined by the quantity of polymer supplied to nozzle 1 per unit of time via an extruder or gear pump (metering pump), the draw-off velocity of the hollow fibers 2 over the conveying rollers 4 and a controlled and metered flow of fluid in the lumen of the hollow fibers 2. From the conveying rollers 4, the hollow fiber cable strand passes over the tension compensator 5 and the reciprocating thread guide 6 onto the winding drum 7.

In the illustrated example, the winding drum 7 has a hexagonal cross section and consequently six planar surfaces, on which the hollow fiber piles are cut or punched out after winding to the desired winding thickness.

As a result of the winding geometry, tension peaks are produced in the cable (or individual hollow fiber) which is to be wound, which tension peaks are either evened out by the tension compensator 5 or taken-up by the stretching properties of the polymer used for the hollow fibers 2. As the winding thickness on the winding drum 7 increases, the winding tension also increases assuming the rotational speed of the drum is maintained constant. In order to avoid this disadvantageous increase in the winding tension, the rotational speed of the drum is reduced either in stages or continuously during the winding cycle so that the winding is effected within a given tension tolerance zone. To this end, the tension compensator 5 can be provided with a starting signal, which influences the rotational speed of the drum and effects a tension-regulated winding. That is, when the winding tension reaches a certain level (as detected by compensator 5), compensator 5 can output a signal which causes the rotational speed of drum 7 to decrease.

The reciprocating thread guide 6, when U-shaped for example, can provide the hollow fiber cable strand with the necessary deflection in order to deposit the cable on the rotating winding drum 7. When comb-shaped, thread guide 6 can deposit the hollow fibers 2 onto the winding drum 7 individually and substantially parallel and adjacent one another.

The velocity of the reciprocating thread guide 6 moving back and forth parallel to the winding drum axis determines the crossing angle of the deposited hollow fiber cable strands or hollow fibers 2 and therefore the volume and density of the hollow fiber pile.

Figure 2:
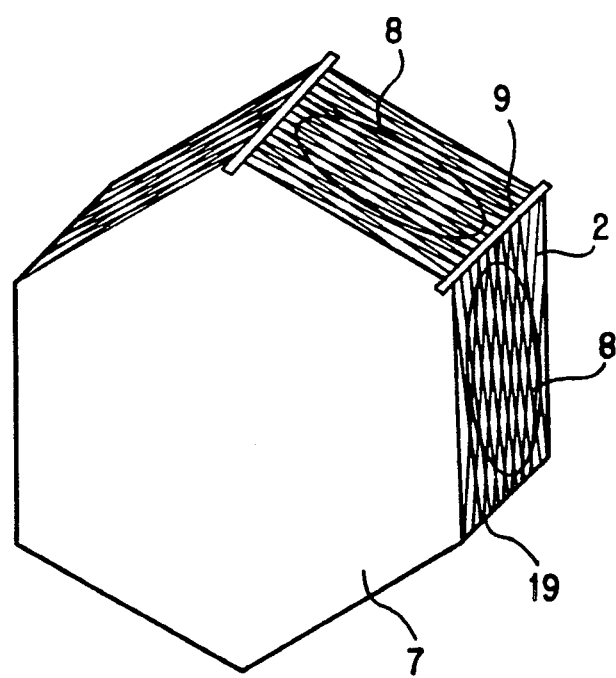
FIG. 2 is a perspective view of a polygonal winding drum wound with at least one hollow fiber.

FIG. 2 is a perspective view of a winding drum 7 having a hexagonal cross section (hexagonal drum) and onto which hollow fibers 2 are wound. The hollow fiber piles are separated from the drum 7, for example, with the aid of a template, along the line 8, as flat circular elements by means of ultrasound and/or thermal or mechanical devices.

In order to fix the individual hollow fiber or cable strand layers on the hexagonal drum 7, the previously wound hollow fibers 2 or hollow fiber cables are held in the correct winding position against the edges 19 of drum 7 by means of a suitable device 9.

When the hollow fiber piles are separated from drum 7, the polymer which makes up the hollow fibers is liquified at the cutting site (for example, by the thermal cutter) and the liquified polymer at the cutting site seals the lumen of the hollow fibers 2. At the same time, upon cooling, the hardened polymer connects the ends of adjacent hollow fibers 2, so that a flat structure is formed which can be easily handled and wherein, at the same time, the positions of the hollow fibers 2 produced during winding are fully maintained.

Figure 3:
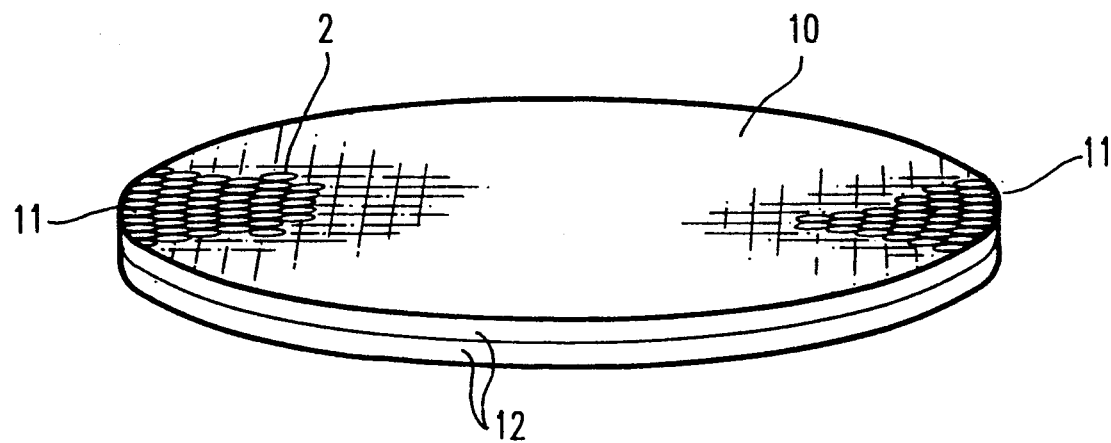
FIG. 3 shows a hollow fiber pile manufactured according to the present invention.

FIG. 3 shows a prepared hollow fiber pile 10 for module assembly. The geometrically arranged hollow fibers 2 are sealed at their ends 11 with liquified polymer and are secured in position by the simultaneous at least spotwise connection of adjacent hollow fiber layers 12. The hollow fiber piles 10 produced in this manner are sufficiently stable for further machine processing and at the same time have the necessary voluminosity required for embedding, for example, with a fluid casting resin.

Figure 4:
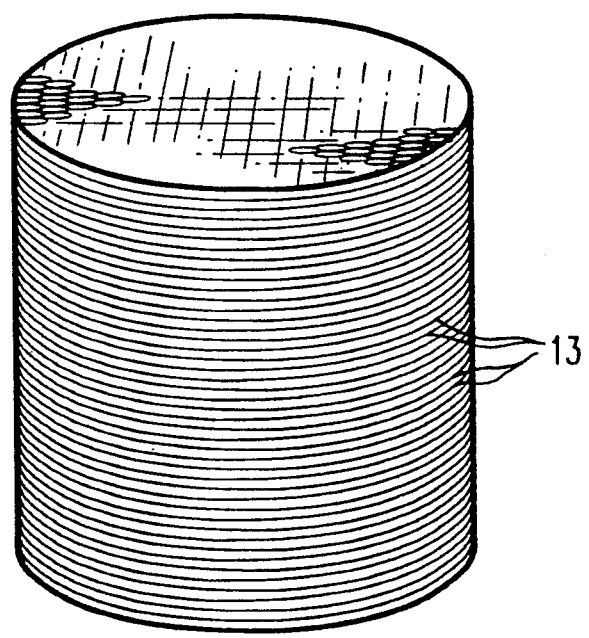
FIG. 4 shows a pre-module formed from stacking a plurality of hollow fiber piles.

FIG. 4 shows a hollow fiber module (pre-module) preassembled from a plurality of hollow fiber piles 13. The individual hollow fiber piles 13 are placed (loosely) on top of one another. In the further course of manufacture, they are optionally firstly secured in their position by casting resin or the like penetrating all cavities.

Figure 5:
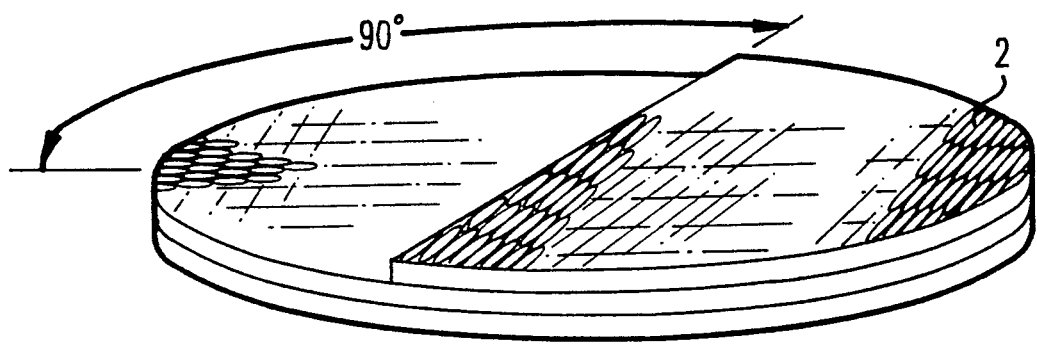
FIG. 5 shows two hollow fiber piles rotated relative to one another.

FIG. 5 shows how, when being assembled to form a module, two successive hollow fiber piles, for example, can be arranged rotated relative to one another about the module axis. In the illustrated example, the rotation is 90°. The angle of rotation can be varied as desired. With a rotation angle of 60°, every sixth hollow fiber pile again reaches the starting position. In this manner, the hollow fiber module is optimized (minimum blocking of fluid flow therethrough) to obtain as little loss of pressure as possible and a uniform distribution of the fluid in the flow space (exterior space which is external of the hollow fibers).

Figure 6:
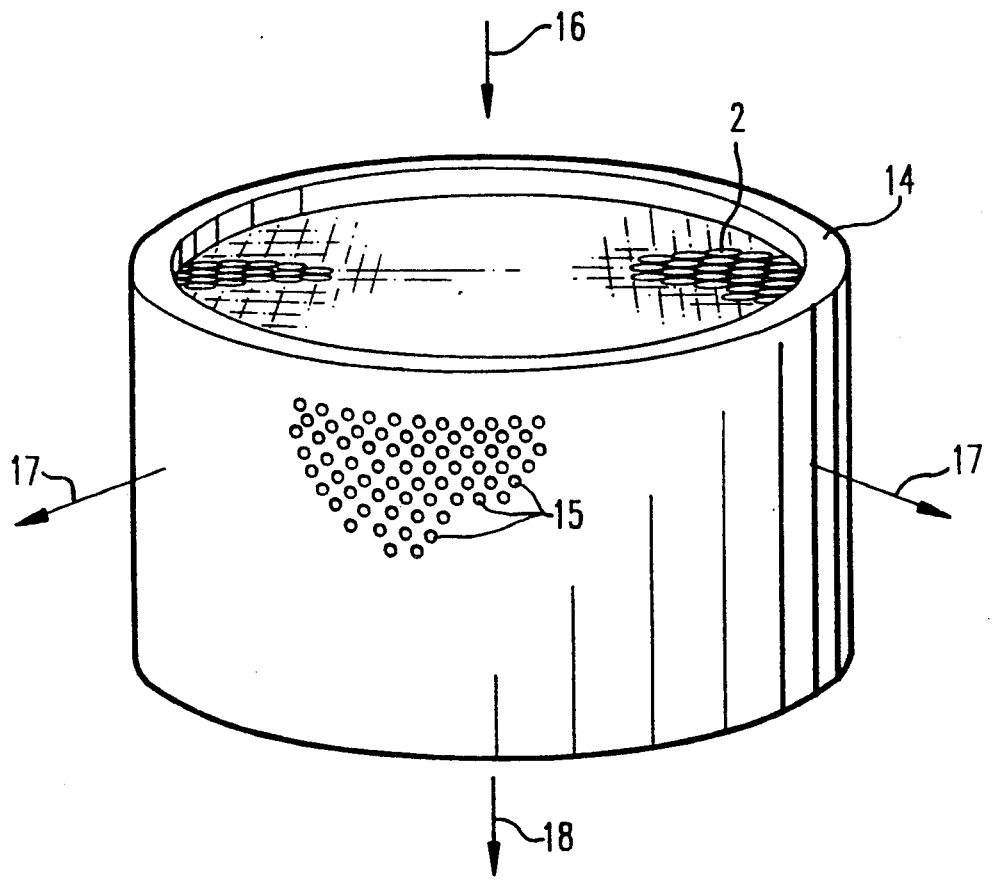
FIG. 6 shows a tubular embodiment of a hollow fiber module wherein at least one hollow fiber pile is partially encased by a tubular shaped embedding material.

FIG. 6 is a perspective view of a tubular module. The manufacture of a module of this type can be effected by embedding the hollow fibers 2 at the outer peripheral regions of the preassembled hollow fiber pre-module according to FIG. 4 in an annular shaped hardening casting material 14 and by removing part of the hardened casting material in order to expose the lumen 15 of the hollow fibers 2. The direction of flow for a first fluid, for example the fluid to be treated, is illustrated by the arrow 16. As the fluid flows through the module, one or more components of the first fluid permeate the membrane wall of the hollow fibers 2 and are drawn off as a second fluid (permeate) towards the outside through the opened lumen 15 of the hollow fibers 2. The flow of permeate is indicated by the lateral arrows 17. The treated, e.g. low in permeate, first fluid (concentrate) is drawn off at the end of the module (arrow 18).

EXAMPLE

Twelve (12) hollow fibers which were melt-extruded from a 12-aperture nozzle, were easily wound simultaneously with a simultaneous traversing motion onto a winding drum having a hexagonal cross section. A conventional running time for the wincing of a polygonal drum until the removal of the hollow fiber pile is approximately 20 min. However, longer running times, leading to thicker hollow fiber piles, can be set. With a reciprocating velocity of the thread guide device of 40 double strokes/min, a hollow fiber external diameter of 20 $\mu$m and 25 overlapping hollow fiber layers, a pile height of approximately 20 mm was obtained. A suitable external diameter of the pile was 300 mm. Modules which have proved to be excellent in practice were composed, for example, of up to 800 superimposed hollow fiber piles manufactured according to the present invention. Disc modules so formed had a membrane surface of up to 1000 m$^2$. Successful modules having an effective diameter of 250 mm and a length of 400 mm, were used for air separation. Successful melt-spun hollow filers having an external diameter of 33 $\mu$m were also processed to form hollow fiber piles, the spinning velocity and consequently the winding velocity being approximately 1000 m/min. The packing density of the hollow fiber module formed from hollow fiber piles manufactured according to the invention was between 30 and 50%, but can also be 25% or 75%. The packing density is understood to mean the ratio of the volume filled by the hollow fibers to the overall volume of the module, expressed as a percentage.

While the present invention is described with reference to a preferred embodiment, this particular embodiment is intended to be illustrative, not limiting. Various modifications may be made without departing from the spirit and scope of the invention as defined in the appended claims.

What is claimed is:

1. A method comprising manufacturing hollow fiber piles, wherein hollow fibers are arranged in substantially flat planes lying parallel to one another, the hollow fibers of each plane being arranged so as to be substantially parallel and at least partially spaced apart from one another, the hollow fibers of adjacent planes crossing one another, and each hollow fiber having end regions at a periphery of said hollow fiber pile and adjacent end regions of hollow fibers being connected with one another at least spotwise, by:
spirally winding at least one hollow fiber strand onto a drum rotating about its longitudinal axis and having a polygonal cross section by using a reciprocating thread guide device to form superimposed substantially planar hollow fiber strand layers so that hollow fibers of one layer cross hollow fibers of directly overlying and underlying layers, out within a single layer extend substantially parallel to one another and at least partially spaced apart;
ending the winding process once a desired number of hollow fiber strand layers have been wound on said drum to form a hollow fiber roll having substantially planar regions; and
separating segments of a desired shape from the substantially planar regions of the hollow fiber roll, wherein the adjacent end regions of the hollow fibers are connected with one another at least spotwise.

2. The method according to claim 1, wherein the connection of the adjacent end regions is performed simultaneously with the separation of said segments from said hollow fiber roll.

3. The method according to claim 1, wherein the connection of the adjacent end regions is performed immediately after the separation of said segments from said hollow fiber roll.

4. The method according to claim 1, wherein said at least one hollow fiber strand is made from a material suitable for separating gas from a fluid.

5. The method according to claim 1, wherein said at least one hollow fiber strand is made from a material suitable for filtration.

6. The method according to claim 1, wherein a plurality of hollow fibers are simultaneously wound onto said drum.

7. The method according to claim 6, wherein said plurality of hollow fibers are in the form of a bundle.

8. The method according to claim 6, wherein said plurality of hollow fibers are spaced apart from one another while being wound onto said drum.

9. The method according to claim 1, wherein said at least one hollow fiber strand is wound onto said drum immediately after being spun from a spinning nozzle.

10. The method according to claim 1, wherein said at least one hollow fiber strand is guided over a tension compensator prior to being wound onto said drum.

11. The method according to claim 1, wherein with increasing thickness of the hollow fiber roll, a rotational speed of the drum is reduced so that a winding tension in the at least one hollow fiber strand is maintained within a predetermined range.

12. The method according to claim 11, wherein said rotational speed is continuously reduced.

13. The method according to claim 11, wherein said rotational speed is reduced in stages.

14. The method according to claim 11, wherein said at least one hollow fiber strand is guided over a tension compensator prior to being wound onto said drum, and wherein the reduction in the rotational speed of the drum is effected via a starting signal provided by the tension compensator.

15. The method according to claim 1, wherein wound hollow fibers are secured to edges of the drum located between faces of said drum prior to the separation of the segments from the hollow fiber roll.

16. The method according to claim 1, further comprising: superimposing a plurality of hollow fiber piles on top of one another to form a hollow fiber stack, wherein adjacent hollow fiber piles are rotatably offset relative to one another by a predetermined angle about a longitudinal axis of the hollow fiber stack.

17. A method of separating gas from a fluid comprising:
providing at least one hollow fiber pile so that the fluid passes around hollow fibers therein, said hollow fiber pile having hollow fibers which are arranged in substantially flat planes lying parallel to one another, the hollow fibers of each plane being arranged so as to be substantially parallel and at least partially spaced apart from one another, the hollow fibers of adjacent planes crossing one another, and each hollow fiber having end regions at a periphery of said hollow fiber pile, and adjacent end regions of hollow fibers being connected with one another at least spotwise, said hollow fiber pile being formed by: spirally winding at least one hollow fiber strand onto a drum rotating about its longitudinal axis and having a polygonal cross-section by using a reciprocating thread guide device to form superimposed substantially planar hollow fiber strand layers so that hollow fibers of one layer cross hollow fibers of directly overlying and underlying layers, but within a single layer extend substantially parallel to one another and at least partially spaced apart; ending the winding process once a desired number of hollow fiber strand layers have been wound on said drum to form a hollow fiber roll having substantially planar regions; and separating segments of a desired shape from the substantially planar regions of the hollow fiber roll, wherein the adjacent end regions of the hollow fibers are connected with one another at least spotwise;
flowing a fluid through said at least one pile; and
removing a gas from said fluid through said hollow fibers.

18. A method of performing filtration, comprising:
providing at least one hollow fiber pile so that the fluid passes around hollow fibers therein, said hollow fiber pile having hollow fibers which are arranged in substantially flat planes lying parallel to one another, the hollow fibers of each plane being arranged so as to be substantially parallel and at least partially spaced apart from one another, the hollow fibers of adjacent planes crossing one another, and each hollow fiber having end regions at a periphery of said hollow fiber pile, and adjacent end regions of hollow fibers being connected with one another at least spotwise, said hollow fiber pile being formed by: spirally winding at least one hollow fiber strand onto a drum rotating about its longitudinal axis and having a polygonal cross-section by using a reciprocating thread guide device to form superimposed substantially planar hollow fiber strand layers so that hollow fibers of one layer cross hollow fibers of directly overlying and underlying layers, but within a single layer extend substantially parallel ton one another and at least partially spaced apart; ending the winding process once a desired number of hollow fiber strand layers have been wound on said drum to form a hollow fiber roll having substantially planar regions; and separating segments of a desired shape from the substantially planar regions of the hollow fiber roll, wherein the adjacent end regions of the hollow fibers are connected with one another at least spotwise;

flowing a fluid through said at least one pile; and removing a component of said fluid from said fluid with said hollow fibers.

* * * * *

UNITED STATES PATENT AND TRADEMARK OFFICE
CERTIFICATE OF CORRECTION

PATENT NO. : 5,126,053
DATED : June 30, 1992
INVENTOR(S) : Klaus SCHNEIDER, Rudi WOLLBECK and Thomas ZANG It is certified that error appears in the above-identified patent and that said Letters Patent is hereby corrected as shown below:

```
Column 2, line 18, change "n" to --invention--.

Column 3, line 30, change "partial)" to --(partial)--;

line 58, change "sparing" to --spacing--.

Column 8, line 47, after "fibers" insert --,--;

line 51, change "wincing" to --winding--.

Column 9, line 32, change "out" to --but--.
```

Signed and Sealed this

Third Day of August, 1993

Attest:

MICHAEL K. KIRK

Attesting Officer     Acting Commissioner of Patents and Trademarks